United States Patent [19]

Lauhoff et al.

[11] Patent Number: 4,775,298
[45] Date of Patent: Oct. 4, 1988

[54] ELECTROMAGNETIC SCREW CHANNEL PUMP FOR LIQUID METALS WITH INTERNALLY DISPOSED POLYPHASE COILS

[75] Inventors: Theodor Lauhoff, Bergisch Gladbach; Joachim Barzantny, Kürten-Eichhof, both of Fed. Rep. of Germany

[73] Assignee: Interatom GmbH, Bergisch Gladbach, Fed. Rep. of Germany

[21] Appl. No.: 894,691

[22] Filed: Aug. 8, 1986

[30] Foreign Application Priority Data

Aug. 8, 1985 [DE] Fed. Rep. of Germany ....... 3528573

[51] Int. Cl.⁴ .......................................... H02K 44/02
[52] U.S. Cl. ...................................... 417/50; 310/11
[58] Field of Search ..................... 417/50; 310/11, 164

[56] References Cited

U.S. PATENT DOCUMENTS

| | | | |
|---|---|---|---|
| 2,905,089 | 9/1959 | Blake | 417/50 |
| 2,988,000 | 6/1961 | Blake | 417/50 |
| 3,026,731 | 3/1962 | Maeder | 310/11 X |
| 3,052,097 | 9/1962 | Tyrner | 60/52 |
| 3,187,672 | 6/1965 | Baker | 417/50 |
| 3,251,302 | 5/1966 | Baker | 417/50 |
| 3,885,890 | 5/1975 | Davidson | 417/50 |
| 4,177,015 | 12/1979 | Davidson | 417/50 |

FOREIGN PATENT DOCUMENTS

| | | |
|---|---|---|
| 1334696 | 6/1970 | France . |
| 1593007 | 7/1970 | France . |
| 2182078 | 12/1973 | France . |
| 608197 | 9/1948 | United Kingdom . |

OTHER PUBLICATIONS

NASA Contractor Report, NASA CR-1571, (Gahan et al), "Primary Loop Electromagnetic Pump Design, Jun. 1970.

Primary Examiner—Carlton R. Croyle
Assistant Examiner—Eugene L. Szczecine, Jr.
Attorney, Agent, or Firm—Herbert L. Lerner; Laurence A. Greenberg

[57] ABSTRACT

Electromagnetic screw channel pump having a helical delivery channel, including polyphase coils for generating a magnetic field travelling in circumferential direction of the delivery channel and a magnetic flux return structure, the polyphase coils being arranged in a cylindrical inner portion, and the magnetic flux return structure being arranged outside of the helical delivery channel.

12 Claims, 1 Drawing Sheet

U.S. Patent
Oct. 4, 1988
4,775,298
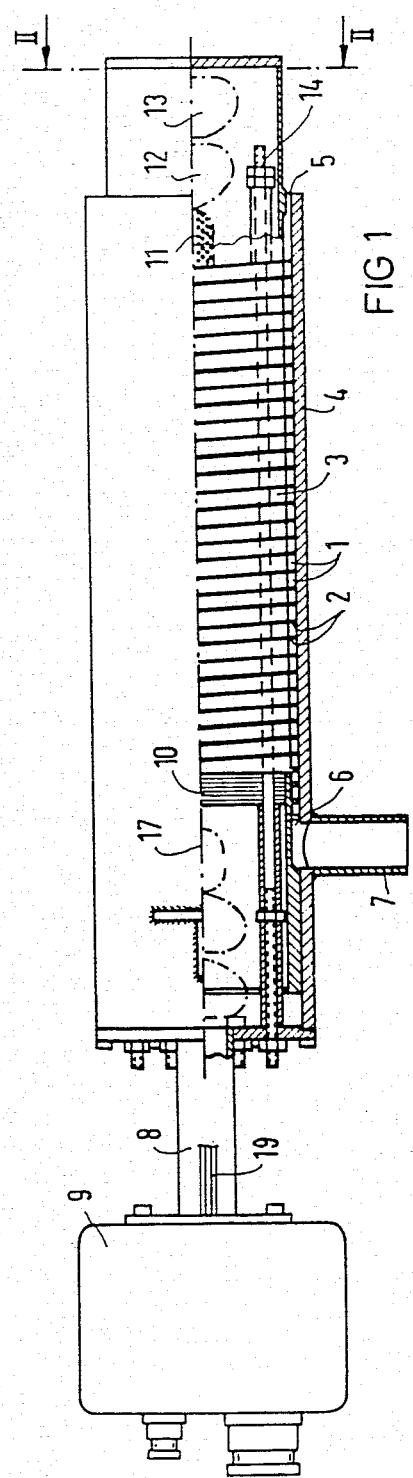
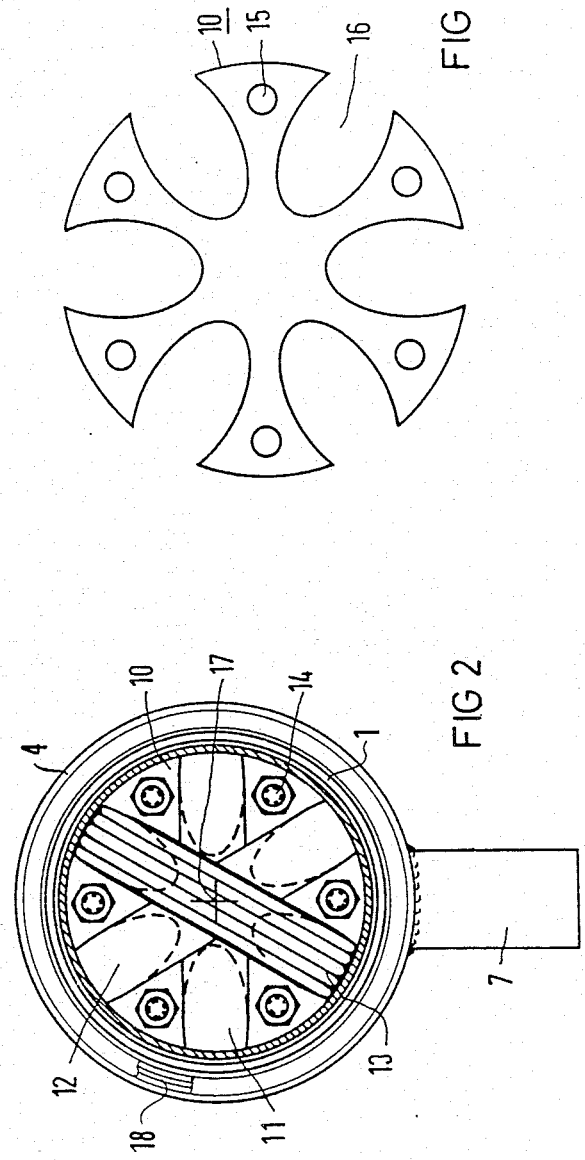
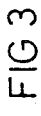

ELECTROMAGNETIC SCREW CHANNEL PUMP FOR LIQUID METALS WITH INTERNALLY DISPOSED POLYPHASE COILS

The invention relates to an electromagnetic screw channel pump, also known as a rotary pump or axial pump, having a helical delivery channel, polyphase coils for generating a magnetic field travelling in circumferential direction of the delivery channel and a magnetic flux return structure. Screw channel pumps having many different types of construction forms have become known heretofore and are used to transport liquid metals at temperatures of several hundred degrees Celsius. They are especially suited for producing a high conveyor or delivery pressure.

Various construction types of such pumps are disclosed in the "NASA CONTRACTOR REPORT", NASA CR-1571, June 1970, Washington D.C. (US), J. W. Gahan et al: "Primary loop electromagnetic pump design". The basic construction of screw channel pumps is also known from French patent No. 1,344,696.

Conventional types of pumps, due to the fact that the magnetic coils lie outside of the screw or helical channel, have a comparatively large size, i.e. occupy a relatively large space, and their use as immersion pumps for relatively small containers is rather limited.

Furthermore, the externally located coils require very large magnet-cores of magnetic sheetmetal, so that the weight of such pumps becomes relatively great.

It is an object of the invention, to provide an electromagnetic screw channel pump which is as compact as possible and which, in particular, has an outer diameter which is as small as possible, whereas the product of the delivered quantity or amount pumped and the conveyor or delivery pressure is as great as possible. Simultaneously, it is an object of the invention to provide such a pump, the manufacture and operation of which is as simple and economical as possible.

With the foregoing and other objects in view, there is provided, in accordance with the invention, an electromagnetic screw channel pump having a helical delivery channel, comprising polyphase coils for generating a magnetic field travelling in circumferential direction of the delivery channel and a magnetic flux return structure, the polyphase coils being arranged in a cylindrical inner portion, and the magnetic flux return structure being arranged outside of the helical delivery channel. Because the magnetic flux return structure requires only little thickness, the diameter of the screw or helical channel can be almost as large as the outer diameter of the whole pump, which has a very desirable effect upon the efficiency and other characteristics of the pump.

In accordance with another feature of the invention, the pump has an outer housing which forms also at least a part of the magnetic flux return structure, when a magnetically conductive material is available which simultaneously is resistant to the liquid metal which is being pumped or delivered. This construction of the inventive pump results in an especially simple and economical pump.

If a strengthening or reinforcement of the magnetic flux return structure is necessary, this can be accomplished, in accordance with a further feature of the invention by providing that the magnetic flux return circuit be formed partly by the outer housing, and partly by a winding formed of magnetically well-conducting material which is arranged inside the outer housing, and outside the helical channel.

In accordance with an added feature of the invention, the pump is constructed as an immersion pump operative at temperatures between 400° and 600° C. This means that, besides a suitable outer casing, the pump must have correspondingly temperature resistant coils and magnetic sheetmetal laminations with a sufficiently high Curie-point.

In accordance with an additional feature of the invention, the pump has an end to be immersed, and includes a ring-shaped inlet cross section of the end which is concentric with the cylindrical inner portion and terminates in the helical delivery channel. This relatively simple construction is suited for immersion pumps, and avoids any necessity for a complicated flow guide at the inlet of the pump.

In accordance with yet another feature of the invention, the helical delivery channel terminates in a ring-shaped channel at an upper end thereof, the ring-shaped channel having a lateral outlet. This construction conforms in general with the requirements for the application of such pumps, and additionally provides access from above to the coils, and facilitates the exchange of the latter.

In accordance with yet a further feature of the invention, the pump includes electrical supply lines to the polyphase coils extending from above into the cylindrical inner portion. Generally, the pump has a supporting tube for suspending it, and the supply lines can be disposed in the interior of this tube. This construction ensures that, in each case, the electrical lines cannot come in contact with the liquid metal.

In accordance with yet an additional feature of the invention, the polyphase coils consist of three coils, wound symmetrically in stellar fashion on top of one another, the coils having respective middle planes intersecting with equal angles a center line of the cylindrical inner portion.

In accordance with an alternate feature of the invention, the polyphase coils consist of six coils wound symmetrically in star-shaped fashion on top of one another, the coils having respective central planes intersecting with equal angles a center line of the cylindrical inner portion.

In accordance with another feature of the invention, the polyphase coils are wound on a laminated core formed of magnetic metal sheets, the core occupying to a maximum extent interior space unoccupied by the coils.

In accordance with a further feature of the invention, the windings of the coils have a substantially oval cross section cut off at one side thereof.

Optimal utilization of the cylindrical inner portion by coils and a suitably shaped magnetic core, respectively, affords a high degree of pump efficiency.

In accordance with an additional feature of the invention, one of the cylindrical inner portion and the cylindrical outer housing is formed with webs coated with a layer of material promoting wetting by a liquid metal being delivered by the pump. This feature is of great advantage for certain liquid metal, especially lead. Because the efficiency of the pump also depends upon the transfer-resistance between the pumped liquid metal, and the rods or webs of the screw or helical channel, it is important that these webs be wetted as much as possible by the metal to achieve small transfer resistances. This can be accomplished by the choice of suitable materials, or by a suitable coating of the inner surfaces of the rods or webs.

In accordance with an added feature of the invention, one of the cylindrical inner portion and the cylindrical outer housing is formed with webs of the helical delivery channel, the webs being formed of material having good electrical conductivity, and the cylindrical inner portion and the magnetic flux return structure have respective walls formed of material having poor electrical conductivity. This feature is of importance in conjunction with the features described hereinbefore or even for differently constructed screw channel pumps. Experience has shown that it is essential for the efficiency of a screw channel pump that as much current as possible should flow through the liquid metal and the webs of the helical channel, in fact, somewhat perpendicularly to the flow direction of the liquid metal. Currents flowing through the walls of the helical channel decrease efficiency, because they do not contribute to driving the liquid metal.

In accordance with another feature of the invention, therefore, the webs are formed of a material having an electrical conductivity which is as good as possible, and the walls are formed of a material which is as poor a conductor as possible, in order to obtain the best possible efficiency. Obviously, the technical compatibility for joining the two materials must be assured, and also the wettability of the web material by the liquid metal being pumped has to be taken into account, as explained hereinabove. Taking these factors into consideration, it is possible, however, to find suitable combinations of the materials for most of the liquid metals which are to be pumped. In cases where no different materials for the spacers and the walls are available, or for further improving the efficiency, there is proposed, in accordance with a concomitant feature of the invention, that the webs of the helical channel be formed as high as possible, and the walls be formed as thin as possible. In this case the cross section available for the effective current is much greater than the cross section for the undesirable wall-currents, which likewise has a desirable effect upon the efficiency as long as the gap width of the magnetic circuit does not become too large.

Other features which are considered as characteristic for the invention are set forth in the appended claims.

Although the invention is illustrated and described herein as embodied in electromagnetic screw channel pump for liquid metals with internally disposed polyphase coils, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which:

FIG. 1 is a longitudinal sectional view of a pump constructed in accordance with the invention;

FIG. 2 is an enlarged cross-sectional view of FIG. 1 taken along the line II—II; and FIG. 3 is an enlarged plan view of a lamination of the magnetic core of FIGS. 1 and 2 formed of magnetic sheet steel.

Referring now to the drawing and, first, particularly to FIG. 1 thereof, there is shown a longitudinal sectional view of a screw-channel pump according to the invention. A screw or helical channel 1 is constructed in a conventional manner i.e. the individual turns of the screw channel 1 are separated from one another by bars or webs 2, which are fastened either to a cylindrical inner part 3 or to a cylindrical outer housing 4. The screw channel 1 can also be formed as a multiple-thread or screw, and the pitch as well as the number of turns thereof determines the discharge pressure and the delivery of the pump. The rule, in general, is: the greater the number of turns, the higher the discharge pressure and, therefore, the lower the delivery of the pump.

In contrast to heretofore known constructions of this general type, the pump according to the invention of the instant application has magnetic coils 11, 12 and 13 in the interior of the cylindrical inner part 3. These coils 11, 12 and 13 are arranged so as to generate a travelling radial magnetic field in circumferential direction of the discharge channel 1.

In the illustrated embodiment, the three coils 11, 12 and 13 are wound symmetrically in the form of a star one on top of the other, the median planes of the wound coils 11, 12 and 13 intersecting with equal angles at a center line 17 of the cylindrical inner part 3. The coils 11, 12, and 13 are wound onto a laminated core 10 of magnetic sheet-steel laminations which, to a maximum extent, fills the space not required for the coils 11, 12 and 13. FIG. 3 shows the shape of one of the magnetic sheet-steel laminations of which the core is formed. A core made of such sheetmetal laminations is held together by screws 14, and can be wound-on in sequence by the coils 11, 12 and 13. The coil 11 which is wound first is shorter at both ends of the core than the coil 12 which is wound next, and the latter is again shorter than the subsequently wound coil 13. Obviously, other forms of winding the coils on top of one another are possible, but cannot be produced quite as simply. In principle, six coils with a corresponding winding arrangement can also be used, however, in general, this is not necessary. The coils can, for example, be supplied with a simple three-phase alternating current. If the pump is to be used as an immersion pump, as in this case, the cylindrical inner part 3 should be welded liquid metal-tight at the lower end thereof so that the coils are protected. The details of construction of the upper end of the pump depends upon particular condition. In general, it would be sensible for the upper side of the pump to be openable for the purpose of removing the windings, or for performing other maintenance work. Furthermore, a suitable suspension or mounting device 8 for handling the pump must be provided. This suspension 8 can be constructed, for example, in the form of a tube in which the electrical supply lines of the pumps are arranged. A suitable terminal or connection box 9 can also be attached to the suspension or mounting arrangement 8. Because of the placement of the coils 11, 12 and 13 in the interior, it is sensible to position the discharge port 7 of the pump at the side. Consequently, the screw channel 1, in an upper region thereof, merges into a ring-channel 6, which is formed with the outlet 7 at the side. Because the space at the top and at the bottom i.e. at both ends of the pump, wherein the coils 11, 12 and 13 are located, cannot be used for pumping, there is sufficient space available to provide a suitable inlet 5 and output 6, 7.

The exact shape of the coils 11, 12 and 13 and the cross-sections of the windings depend upon the spatial conditions. A cross-section in the form of an oval 16 which is cut off at one side thereof has been found to be most advantageous for the windings. With such a shape, the magnetic sheetmetal or steel laminations which form the core 10 have a particular good shape for the magnetic flux, and have adequate mechanical strength notwithstanding the holes 15 required to be formed therein for receiving the fastening screws 14.

The use of the coils 11, 12 and 13 disposed in the interior with a magnetic closing circuit or ground 4 at the outside affords an additional advantage. Ferritic materials expand less with a rise in temperature than austenitic materials, for example. Consequently, if the cylindrical inner part 3, and possibly the rods or webs 2 are formed of austenitic material, no gap develops between the outer casing 4 and the rods or webs 2 when the pump gets hot, thereby avoiding any efficiency loss.

The pump according to the invention is especially well suited for transporting molten lead or other liquid metals with high specific weight, and at pressures of about 1 to 10 bar, for example, so that even when casting lead, instead of using a conventional gravity casting system, a pressurized casting system can be used which reduces the danger of releasing lead into the environment.

The foregoing is a description corresponding, in substance, to German application P No. 35 28 573.7, dated Aug. 8, 1985, international priority of which is being claimed for the instant application, and which is hereby made part of this application. Any material discrepancies between the foregoing specification and the specification of the aforementioned corresponding German application are to be resolved in favor of the latter.

There is claimed:

1. Electromagnetic screw channel pump having a helical delivery channel, comprising polyphase coils for generating a magnetic field travelling in circumferential direction of the delivery channel and a magnetic flux return structure, said polyphase coils being arranged in a cylindrical inner portion stationary with respect to said magnetic flux return structure and consisting of at least three coils wound symmetrically in star-shaped fashion on top of one another, said coils having respective central planes intersecting with equal angles a center line of said cylindrical inner portion, and said magnetic flux return structure being arranged outside of the helical delivery channel.

2. Screw channel pump according to claim 1 including an outer housing forming at least part of said magnetic flux return structure.

3. Screw channel pump according to claim 2 wherein said magnetic flux return structure is formed partly by said outer housing and partly by a winding formed of material having good magnetic conducting properties which is arranged inside said outer housing.

4. Screw channel pump according to claim 1 having the construction of an immersion pump operative at temperatures of from 400° to 600° C.

5. Screw channel pump according to claim 4 having an end to be immersed, and including a ring-shaped inlet cross section at said end which is concentric with said cylindrical inner portion and terminates in the helical delivery channel.

6. Screw channel pump according to claim 1, wherein the helical delivery channel terminates in a ring-shaped channel at an upper end thereof, said ring-shaped channel having a lateral outlet.

7. Screw channel pump according to claim 1 including electrical supply lines to said polyphase coils extending from above into said cylindrical inner portion.

8. Screw channel pump according to claim 1, wherein said polyphase coils are wound on a laminated core formed of magnetic metal sheets, said core occupying to a maximum extent interior space unoccupied by said coils.

9. Screw channel pump according to claim 1, wherein windings of said coils have a substantially oval cross section cut off at one side thereof.

10. Screw channel pump according to claim 1, wherein one of said cylindrical inner portion and said magnetic flux return structure is formed with webs coated with a layer of material promoting wetting by a liquid metal being delivered by the pump.

11. Screw channel pump according to claim 1, wherein said magnetic flux return structure comprises a cylindrical outer housing, and one of said cylindrical inner portion and said cylindrical outer housing is formed with webs of the helical delivery channel, said webs being formed of material having good electrical conductivity, and said cylindrical inner portion and said magnetic flux return structure have respective walls formed of material having poor electrical conductivity.

12. Screw channel pump according to claim 1, wherein one of said cylindrical inner portion and said magnetic flux return structure is formed with webs which are as high as possible, and said cylindrical inner portion and said magnetic flux return structure have respective walls which are as thin as possible.

* * * * *